Nov. 5, 1963

C. C. GEBHARDT 3,110,022

RADAR ANTENNA SPEED REFERENCE APPARATUS

Filed April 29, 1960

INVENTOR.
CARL C. GEBHARDT,
BY Robert H. Himes
ATTORNEY.

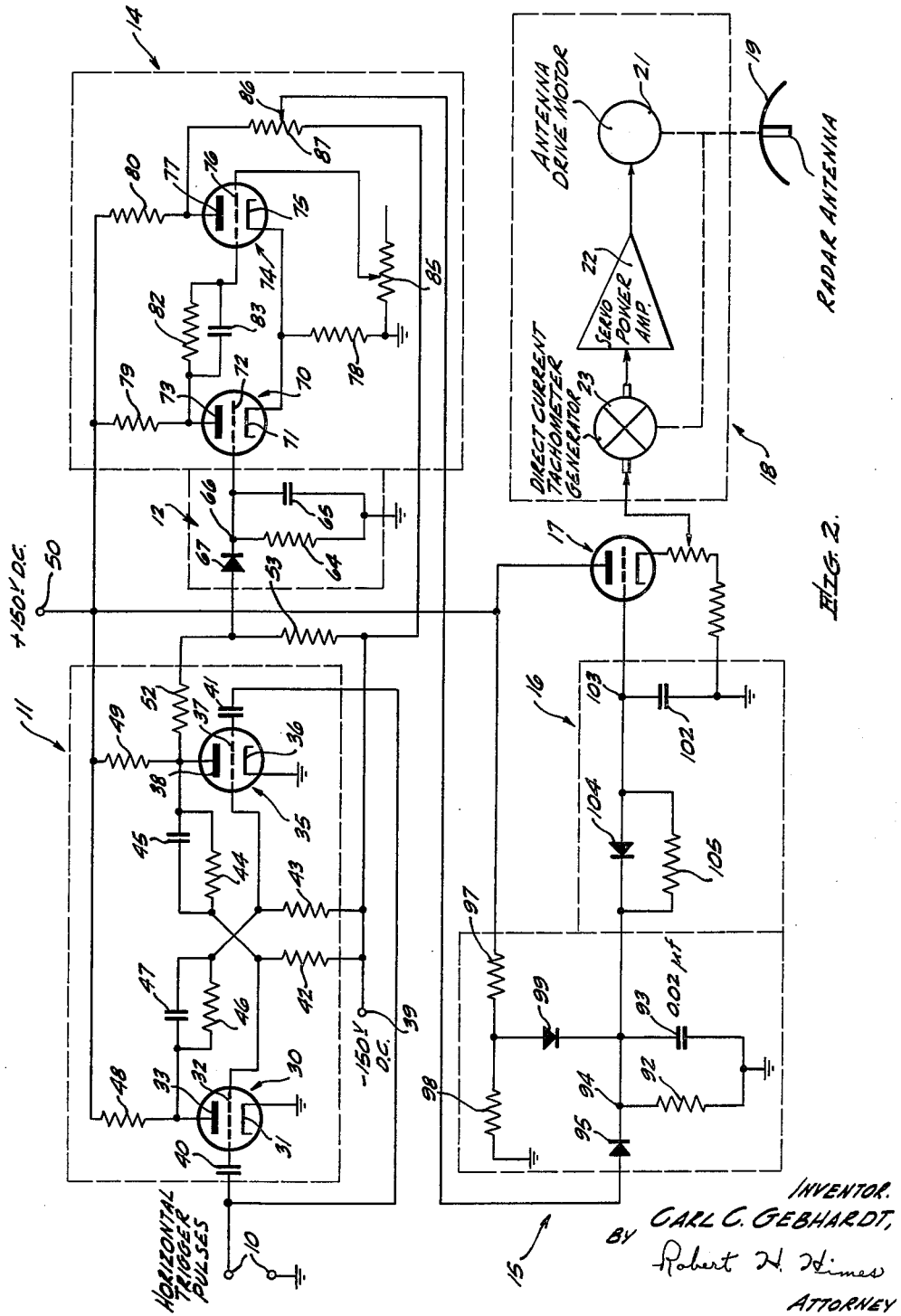

United States Patent Office 3,110,022
Patented Nov. 5, 1963

3,110,022
RADAR ANTENNA SPEED REFERENCE APPARATUS
Carl C. Gebhardt, Garden Grove, Calif., assignor to Hughes Aircraft Company, Culver City, Calif., a corporation of Delaware
Filed Apr. 29, 1960, Ser. No. 25,789
2 Claims. (Cl. 343—5)

This invention relates to an apparatus for assuring voidless scanning of a volume with a pencil beam antenna and more particularly to an apparatus for limiting the azimuth scanning rate of a pencil beam search radar antenna to a speed no greater than that of the elevation scan.

A present type of radar system employs what is designated as a "pencil" beam of radiation thereby to provide azimuth and height information as well as target range. Three-dimensional target information is thus obtained with a single radar system. In order to accomplish this function, however, it is necessary that the radar system scan in elevation as well as in azimuth. The interval of time required to complete an elevation scan is determined by the number of elevation beam positions selected and the number of hits per beam. Inasmuch as these variables are controlled by the radar operator as desired, elevation scan time may vary from perhaps two to about 100 milliseconds.

One manner of limiting the azimuth scanning rate to effect voidless scanning of a volume is to employ a number of switches and resistor-divider networks to select a given azimuth speed for a given elevation scanning time. This approach, however, is not very practical in that there are over 2000 combinations of elevation and azimuth scanning times possible.

Alternatively, a gated linear sweep voltage can be generated and shaped with several biased diode limiters and an operational amplifier, the output of which is applied to a peak detector.

It is therefore an object of the present invention to provide an improved apparatus for limiting the azimuth scanning rate of a pencil beam search radar to effect voidless scanning of a volume.

Another object of the present invention is to provide a more economical apparatus for limiting the azimuth scanning rate of a pencil beam search radar than presently available.

Still another object of the present invention is to provide a radar apparatus adapted to enable an operator to select any azimuth speed less than a maximum allowable speed for any given elevation scanning time to effect voidless scanning of a volume.

A further object of the present invention is to provide an apparatus adapted to limit the azimuth scanning rate in accordance with a function voltage waveform adapted to approximate a theoretical maximum azimuth scanning rate versus the actual elevation scanning rate.

The apparatus of the present invention is primarily adapted for use in conjunction with a radar system wherein a pencil beam is moved electronically in elevation and rotated mechanically in azimuth. In the operation of a radar system of this type, the antenna which generates the pencil beam is rotated in azimuth at a constant speed by a conventional velocity servomechanism. Because of the finite azimuthal width of the pencil beam, it is important that the azimuth scan rate does not exceed the elevation scan rate, i.e., an entire elevation scan must be completed for each azimuthal position of the antenna. In accordance with the present invention, a reference voltage which varies as a function of the elevation scan time is generated and applied to the azimuth velocity servo so that the azimuth scan rate never exceeds the elevation scan rate of the pencil beam. A radar operator may arbitrarily select any azimuth speed less than a maximum allowable speed for any given elevation scanning time.

The above-mentioned and other features and objects of this invention and the manner of obtaining them will become more apparent by reference to the following description taken in conjunction with the accompanying drawings, wherein:

FIG. 2 is a schematic circuit diagram of the apparatus of FIG. 1;

Figure 1:
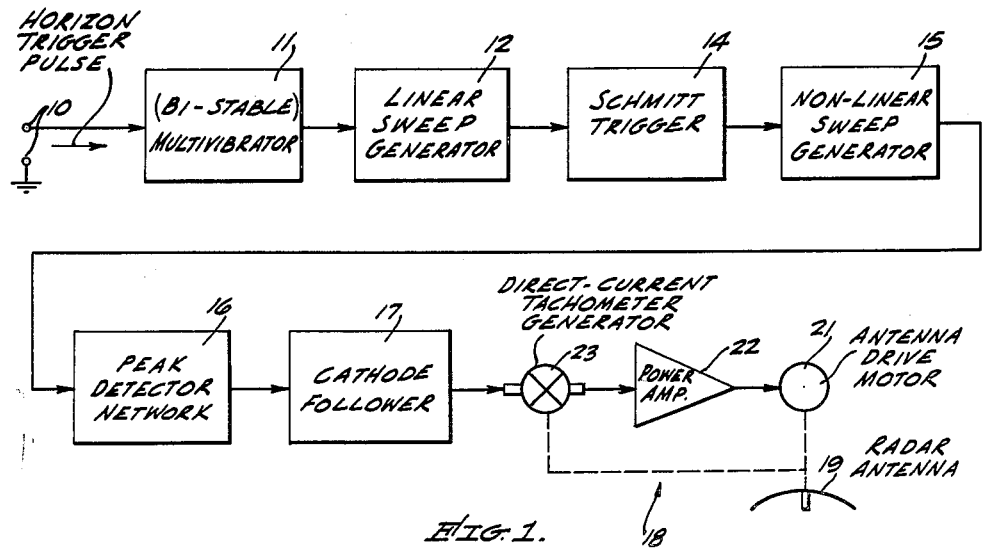
FIG. 1 is a schematic block diagram of a preferred embodiment of the apparatus of the present invention.
Figure 3:
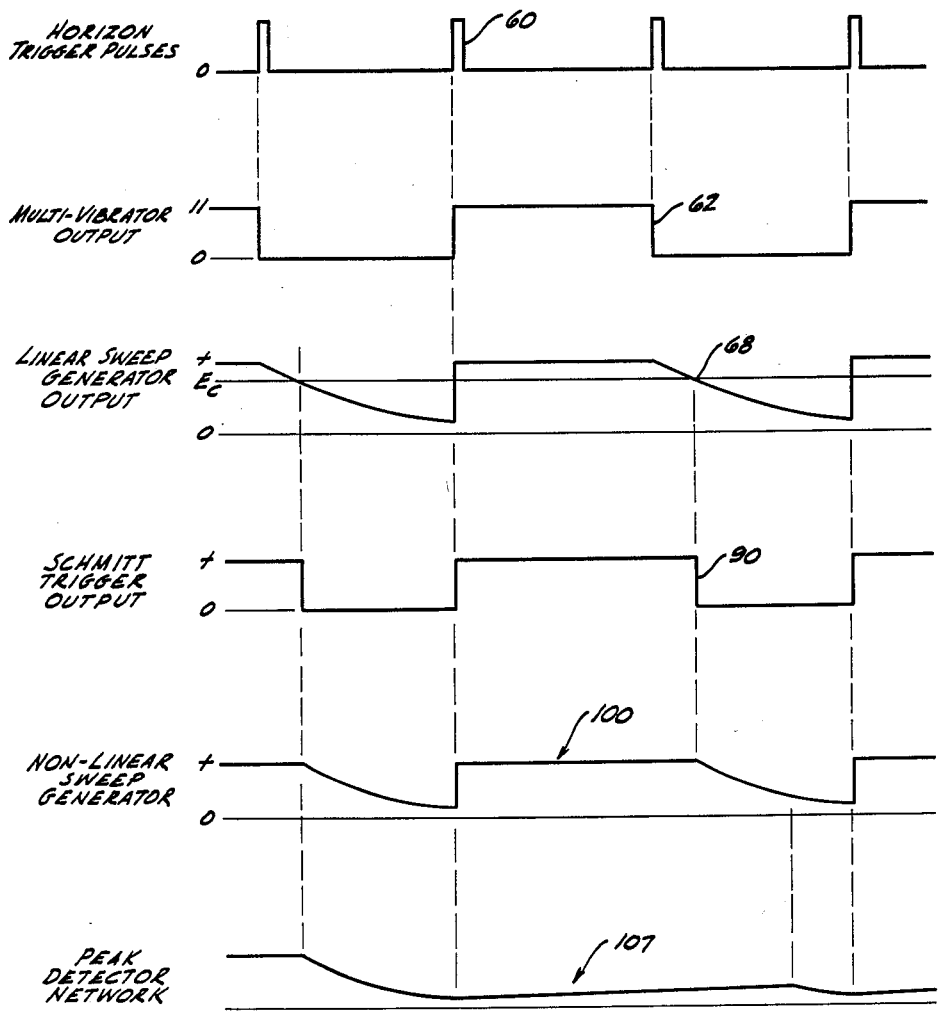
FIG. 3 illustrates various waveforms generated by the apparatus of FIG. 2.

Referring now to FIG. 1 of the drawings, a preferred embodiment of the apparatus of the present invention comprises input terminals 10 responsive to horizon trigger pulses represented by pulse waveform 60, FIG. 3, and are connected to the input of a bi-stable multivibrator 11 which is adapted to change state in response to every horizon trigger pulse applied thereto. These trigger pulses may be the same as the pulse wave-train employed to generate the vertical scanning. In some radar systems, it is the practice to "interlace" two or more elevation scans. In this event, for the purposes of the present teachings each field of the scan pattern is considered a separate elevation scan. The bi-stable multivibrator 11 in response to the trigger pulse generates a bi-level voltage output waveform 62, FIG. 3, which is applied to a linear sweep generator 12 that is adapted to develop a negative going sweep voltage waveform 68 commencing with each negative alternation of the output voltage waveform 62 from the bi-stable multivibrator 11. The linear sweep voltage waveform 68 thus generated by the linear sweep generator 12 is, in turn, employed to control the state of a Schmitt trigger generator 14. A Schmitt trigger generator is characterized by the fact that its output changes state in either direction in response to whether or not a signal applied to its input is above or below a predetermined voltage level, $E_c$. In the described embodiment, the portion of the output voltage waveform 68 of the linear sweep generator 12 that is more positive than voltage level $E_c$ is employed in a manner to determine the duration of the more negative potential level of the output signal waveform 90 generated by the Schmitt trigger generator 14. Thus, if the output voltage waveform 68 of the linear sweep generator 12 remains more positive than the predetermined voltage level, the Schmitt trigger generator 12 will generate an output signal that is of a constant voltage level. On the other hand, if the output voltage waveform of generator 12 has excursions which go from more positive to less positive than the predetermined potential level, $E_c$, at which the Schmitt trigger generator 14 changes state, the Schmitt trigger generator 14 will develop a sequence of negative gates 90 each having a duration that is shorter than the interval of time between successive horizon trigger pulses by the time required for the voltage waveform 68 to decay to the potential level $E_c$. The output signal 90 generated by the Schmitt trigger generator 14 which may be either a uni-level voltage or a waveform constituting a series of negative going gates is applied to a non-linear sweep generator 15. In the case of the uni-level signal, the non-linear sweep generator 15 develops an output signal which is of a constant positive potential. Alternatively, when the Schmitt trigger generator develops a series of negative gates 90, the non-linear generator 15 develops an output waveform 100 which commences with a uni-level potential. Subsequently, however, the uni-level potential decays towards a second lower but positive potential level in an exponential manner for the duration of the corresponding negative gate 90. The waveform 100 developed at the output of the non-linear sweep generator 15 is applied to a peak detector network 16 which produces an output voltage 107 that is substantially of a level equal to the least negative point of the voltage waveform 100 applied thereto. Thus, the longer the interval between the horizon trigger pulses applied to the input terminals 10, the wider the negative gates 90 and consequently the lesser the amplitude of the voltage waveform 107 generated at the output of the peak detector network 16. Also, if the interval between the horizon trigger pulses 60 is sufficiently short so that the linear sweep generator 12 develops a potential which always remains more positive than the potential level $E_c$, whereby the Schmitt trigger generator 14 develops a uni-level potential, the non-linear sweep generator 15 and the peak detector network 16 will, in turn, develop uni-level potential output signals. The voltage waveform 107 thus generated at the output of network 16 is applied through a cathode follower 17 to a velocity servomechanism 18, which mechanism drives a radar antenna 19 at an azimuthal velocity that is proportional to the amplitude of the voltage applied thereto.

In particular, the velocity servomechanism 18 includes an antenna drive motor 21 which is mechanically coupled to the radar antenna 19 in a manner to rotate it in an azimuthal direction. The antenna drive motor 21 is, in turn, energized by a power amplifier 22 which produces an output voltage that is proportional to the amplitude of a voltage applied to the input thereof. This input voltage is developed by a direct-current tachometer generator 23 which includes a rotor that is also mechanically coupled to the radar antenna 19 in such a manner to rotate at a speed proportional to the angular rotation thereof. Further, the remaining terminal of tachometer generator 23 is connected to the output of the cathode follower 17 in a manner such that the rotation of the rotor develops a voltage which cancels the signal developed at the output of cathode follower 17. Field excitation of tachometer generator 23 is provided by permanent magnets. In explaining the operation of the velocity servomechanism 18, it might first be assumed that the radar antenna 19 is at a standstill position. Thus, the voltage applied to the tachometer generator 23 from the cathode follower 17 will pass through the armature thereof and will appear at the input of the power amplifier 22. The power amplifier 22 will, in turn, produce an output voltage which drives the antenna drive motor 21 in a manner to rotate the radar antenna 19 in a direction which will, in turn, rotate the armature of the tachometer generator 23 in a direction to generate a voltage which opposes and cancels the voltage applied from the cathode follower 17 through the armature thereof. Thus, when the radar antenna 19 is rotating at a velocity sufficient to generate a back electromotive force in the rotor of the tachometer generator 23 of an amplitude to exactly cancel the voltage applied thereto from the cathode follower 17, the signal applied to the input of power amplifier 22 will equal substantially zero and the radar antenna 19 will be rotating at an angular velocity that is proportional to the amplitude of the voltage waveform 107 generated at the output of the peak detector networks 16 and the cathode follower 17. The operation of this portion of the apparatus is considered conventional.

Referring now to FIG. 2, there is shown specific mechanization of the apparatus described generally in FIG. 1. In particular, the bi-stable multivibrator 11 comprises a triode 30 which includes a cathode 31, a control grid 32 and a plate 33, and a second triode 35 which includes a cathode 36, a control grid 37 and a plate 38, the cathodes 31, 36 of which are both connected directly to ground. The high side of the input terminals 10 is connected through a capacitor 40 to the control grid 32 of the triode 30, and also through a capacitor 41 to the control grid 37 of the triode 35. The remaining low side of the input terminals 10 is connected to ground. The control grids 32, 37 of triodes 30, 35 are connected through resistors 42, 43, respectively, to a terminal 39 which is maintained at a negative direct-current potential level of the order of −150 volts with respect to ground. Further, the control grid 32 of triode 30 is connected through a parallel-connected resistor 44 and capacitor 45 to the plate 38 of triode 35 and the control grid 37 of triode 35 is connected through a parallel-connected resistor 46 and capacitor 47 to the plate 33 of triode 30. Lastly, the plates 33, 38 of triodes 30, 35 are connected through load resistors 48, 49, respectively, to a terminal 50 maintained at a positive direct-current level of the order of +150 volts with respect to ground. An output circuit is provided by a resistor dividing network and includes resistors 52, 53 which are connected in series from the plate 38 of triode 35 to the terminal 39.

In operation, the horizon trigger pulses having a voltage waveform 60 are applied across the input terminals 10. The time interval between successive pulses represents the time during which an elevation scan must be completed. In the apparatus of FIG. 2, the triode 30 or 35 which is not conducting becomes conductive each time a positive pulse of the waveform 60 is received. Thus, a square wave having the voltage waveform 62 is generated at the output of multivibrator 11 at the junction between resistors 52 and 53. The resistors 52 and 53 effect a voltage division so that the more positive potential level of the voltage waveform 62 can be adjusted to a predetermined amount above the critical potential, $E_c$, of the Schmitt trigger generator 14.

The linear sweep generator 12 is provided by a resistor 64 and capacitor 65 connected in parallel from a junction 66 to ground. The resistor 64 may, for example, be of the order of 5 megohms and the capacitor 65 of the order of 0.01 microfarad. The junction 66 is, in turn, connected through a diode 67 to the junction between resistors 52 and 53 of the output circuit of the multivibrator 11 and poled so as to allow the more positive potential level of the square wave output waveform 62 appearing thereat to charge the capacitor 65. In operation, the more positive alternation of the square wave voltage waveform 62 charges the capacitor 65 to a potential substantially equal to the more positive potential level thereof. Subsequent discharge of the charge across capacitor 65 through resistor 64 produces the linear sweep voltage waveform 68 shown in FIG. 3.

The voltage waveform 68 generated by the linear sweep generator 12 is applied to the Schmitt trigger generator 14 which includes a triode 70 having a cathode 71, a control grid 72 and a plate 73, and a triode 74 having a cathode 75, a control grid 76 and a plate 77, the cathodes 71 and 75 of which are connected through a common resistor 78 to ground. Further, the control grid 72 of triode 70 receives the voltage waveform 68 and the plates 73, 77 are connected, respectively, through resistor 79 and 80 to the terminal 50 which is maintained at the positive potential level of the order of +150 volts with respect to ground. The plate 73 of triode 70 is further connected through parallel-connected resistor 82 and capacitor 83 to the control grid 76 of triode 74, which control grid 76 is also connected through adjustable resistor 85 to ground. An output from the Schmitt trigger generator 14 is provided by an adjustable tap 86 of a potentiometer 87 which is connected from the plate 77 of triode 74 to the terminal 39 which is maintained at the negative direct-current potential level of −150 volts relaive to ground. In operation, only one of the triodes 70 or 74 conducts at one time, the one which conducts being determined by the relative potential levels existing on the respective control grids 72, 76. The potential at which conduction will shift from one triode to the other may be adjusted by the adjustable resistor 85.

Figure 4:
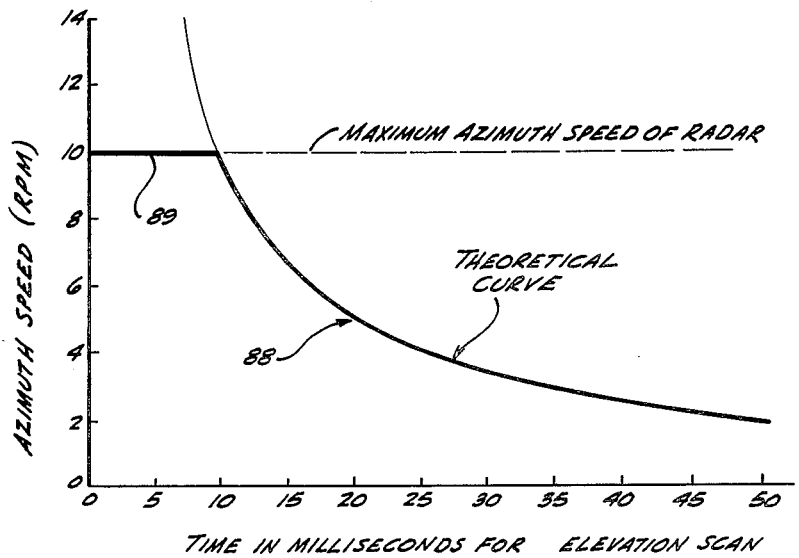
FIG. 4 illustrates a theoretical curve of the maximum azimuth speed vs. elevation scan time to accomplish voidless scanning.

Referring to FIG. 4, there is shown a theoretical curve 88 which shows the maximum azimuth speed of a particular radar vs. the time in milliseconds to complete an elevation scan, i.e., the time between successive horizon trigger pulses. As can be seen from the curve 88, there is a flat portion 89 where, regardless of how fast an elevation scan can be completed, the maximum azimuth speed of the radar remains constant. Subsequent to the flat portion 89, the curve 88 decays as a function of the quotient of the antenna beamwidth in degrees as measured between one-half power points divided by the time required to complete an elevation scan. This decay portion of curve 88 very nearly approximates an exponential decay. The curve 88 is approximated by first adjusting the resistor 85 of the Schmitt trigger generator 14 so that the voltage across capacitor 65 coincides in magnitude with potential level $E_c$ thereby producing a negative gate which commences at a time after alternate trigger pulses 60 that is substantially equal to the interval of time during which the maximum azimuth speed of the radar remains constant irrespective of the time during which an elevation scan can be completed. Thus, if the critical voltage of the Schmitt trigger generator 14 is set at $E_c$, as shown in FIG. 3, the time interval from the point of the sweep voltage waveform 68 that corresponds to the trailing edge of the square waveform 62 and the intersection of the voltage $E_c$ with the waveform 68 is the time which should conform to the intervals through which the maximum azimuth speed of the radar remains constant. Thus, if a sweep voltage waveform 68 generated by the linear sweep generator 12 has potentials which go both above and below the potential level $E_c$, the Schmitt trigger generator 14 will generate a series of negative gates 90, delayed from the immediately prior trigger pulse by an interval of time which conforms to the portion 89 of curve 88, i.e. the time during which the maximum azimuth speed of the radar is constant. On the other hand, if the voltage level of the waveform 68 generated by the linear sweep generator 12 remains above the critical potential $E_c$, the output voltage of the Schmitt trigger generator 14 will remain constant at the more positive potential level of the gates 90.

The voltage waveform 90 generated by the Schmitt trigger generator 14 is applied to the non-linear sweep generator 15. The generator 15 includes a resistor 92 and a capacitor 93 connected in parallel from a junction 94 to ground. A diode 95 is connected from the output of the Schmitt trigger generator 14 to the junction 94 and is poled so as to allow positive excursions of the waveform 90 generated at the output of the Schmitt trigger generator 14 to charge the capacitor 93. A minimum positive charge is maintained across the capacitor 93 by a voltage divider network composed of resistors 97 and 98 connected in series from the terminal 50 to ground. A diode 99 is connected from the junction between resistors 97 and 98 to the junction 94 and poled so as to allow current to flow towards the junction 94. The resistors 97, 98 have ohmic values which maintain a charge of the order of +2 volts with respect to ground across the capacitor 93. In operation, the voltage waveform 90 is applied through the diode 95 to charge up the capacitor 93 to the more positive potential level of the gates 90. The capacitor 93 maintains a charge for the duration of each positive portion of the gate voltage waveform 90 and then discharges exponentially through resistor 92 towards the lower potential level established by the voltage divider network provided by resistors 97, 98. In order to accomplish this latter function, the time constant of the capacitor 93 together with the resistor 92 is designed to be of the order of 0.5 times the maximum period between successive horizon trigger pulses thereby to conform with the theoretical characteristic 88, FIG. 4. A signal having a voltage waveform 100 is thus generated at the junction 94. It is evident that the longer the interval between the horizontal trigger pulses 60, the more nearly the voltage waveform 100 will approach the potential level established by the resistors 97, 98.

The least negative potential of the voltage waveform 100 is detected by the peak detector network 16. The network 16 is composed of a large capacitor 102 connected from a junction 103 to ground. In addition, a diode 104 and a resistor 105 are connected in parallel from the junction 94 to the junction 103, the diode 104 being poled so as to allow current to flow from junction 103 to junction 94. In operation, when the voltage waveform 100 is more positive than the charge across capacitor 102, charging thereof is effected very slowly through the resistor 105 which is, for example, of the order of 20 megohms. When the voltage level of the waveform 100 is negative relative to the voltage across capacitor 102, however, the capacitor 102 discharges through diode 104 and resistor 92 to ground until the voltage at junction 94 is nearly equal to that at tap 86. The resulting voltage waveform is thus a voltage which varies as the most negative portions of the voltage waveform 100. The signal developed at junction 103 is illustrated as voltage waveform 107, FIG. 3. The amplitude of the voltage waveform 107, in effect, represents a point on the theoretical curve 88 of FIG. 4. That is, for a given elevation scan rate (the time interval between horizon trigger pulses 60), a maximum azimuth speed to achieve voidless scanning is automatically determined. The voltage waveform 107 which represents this maximum azimuth speed is applied through the cathode follower 17 to the velocity servomechanism 18 which rotates the radar antenna 19 at an angular velocity proportional to the amplitude of the voltage 107. The antenna drive motor 21 does not respond to the minor fluctuations in the amplitude of the voltage waveform 107.

What is claimed is:

1. In a radar system including an antenna adapted to scan a pencil beam electronically in elevation and mechanically in azimuth, each elevation scan being initiated by horizon trigger pulses and the maximum allowable azimuthal rotational velocity of said antenna for voidless scanning corresponding to a minimum elevation scan interval of time, said azimuthal rotational velocity decreasing hyperbolically from said maximum value to a minimum azimuthal rotational velocity for linearly increasing elevation scan intervals of time, an apparatus for assuring voidless scanning of a volume comprising means responsive to said horizon trigger pulses for producing gating signals delayed from the respective prior horizon trigger pulse by an interval of time substantially equal to said minimum elevation scan interval of time, means responsive to said delayed gating signals for producing exponentially decaying voltage waveforms commencing from the respective leading edges of said delayed gates and continuing to the next successive horizon trigger pulse thereby to approximate said hyperbolic decrease, means for detecting said exponentially decaying voltage waveforms to produce an output signal indicative of the minimum amplitude thereof, and means responsive to said output signal for rotating said antenna at an azimuthal rotational velocity proportional to the amplitude of said output signal.

2. In a radar system including an antenna adapted to scan a pencil beam electronically in elevation and mechanically in azimuth, each elevation scan being initiated by horizon trigger pulses and the maximum allowable azimuthal rotational velocity of said antenna for voidless scanning corresponding to a minimum elevation scan interval of time, said azimuthal rotational velocity decreasing hyperbolically from said maximum value to a minimum azimuthal rotational velocity for linearly increasing elevation scan intervals of time, the apparatus for assuring voidless scanning of a volume as defined in claim 1 wherein said means responsive to said delayed gating signals for producing exponentially decaying voltage waveforms commencing from the respective leading edges of said delayed gates and continuing to the next successive horizon trigger pulse thereby to approximate said hyperbolic decrease includes a capacitor and a resistor connected in parallel from a first junction to a terminal maintained at a substantially fixed reference potential, a first uni-directionally conducting device responsive to said delayed gating signals and connected to and poled to allow current to flow towards said first junction, a source for providing a potential corresponding to said minimum azimuthal rotational velocity, and a second uni-directionally conducting device connected and poled to allow current to flow from said source to said first junction thereby to generate said exponentially decaying voltage waveforms at said first junction.

No references cited.